United States Patent [19]

Bielskis

[11] 3,855,149
[45] Dec. 17, 1974

[54] METHOD OF INCREASING COLD WATER SOLUBILITY OF LOCUST BEAN GUM

[75] Inventor: Edward C. Bielskis, Chicago, Ill.

[73] Assignee: C. J. Patterson Company, Kansas City, Mo.

[22] Filed: Nov. 13, 1972

[21] Appl. No.: 305,929

[52] U.S. Cl............... 252/363.5, 106/208, 252/311, 252/314, 252/359 A
[51] Int. Cl........................... B01f 3/12, B01j 13/00
[58] Field of Search .......... 252/363.5, 314; 106/208

[56] References Cited
UNITED STATES PATENTS 2,949,428   8/1960   Leo ................................ 252/363.5
2,992,188   7/1961   Miller et al. ..................... 252/363.5

*Primary Examiner*—Richard D. Lovering
*Attorney, Agent, or Firm*—Schmidt, Johnson, Hovey & Williams

[57] ABSTRACT

A method is provided for increasing the cold water solubility of locust bean gum which comprises adding a predetermined amount of water to the dry gum and subjecting it to an increase in temperature while applying agitation, compression and shear, as in a cooker-extruder. In a preferred embodiment, guar gum is mixed with the locust bean gum in order to enhance the solubility and viscosity characteristics of the final product.

18 Claims, No Drawings

METHOD OF INCREASING COLD WATER SOLUBILITY OF LOCUST BEAN GUM

BACKGROUND

This invention relates to a new and improved method for the production of novel locust bean gum preparations. More particularly, it pertains to such a method which yields gums having enhanced solubility, even in cold water. The new process is applicable to the production of other cold water soluble gums and colloids, but it is contemplated that the invention be primarily concerned with the production of cold water soluble locust bean gum preparations.

It is well known that locust bean gum powder or flour (ceratonia siliqua) obtained from the fruit seeds of the locust or carob tree, possesses desirable adhesive, deflocculating and stabilizing properties which make it useful as an emulsifying agent. Equally well-known, however, is the inability of locust bean gum suspensions to achieve an appreciable fraction of the viscosity in cold water as they would have if heated to 170° and then cooled. Such lack of cold water solubility has seriously militated against the use of locust bean gum in the various arts where its known properties would otherwise be most advantageous.

It is also well-known that naturally occurring locust bean gum will be rendered soluble by simply heating in the presence of sufficient moisture; however, upon drying, the gum generally returns to its prior state and is again insoluble in cold water. It is believed that this phenomenon results from the fact that during heating the generally coiled molecular chains "uncoil," thereby allowing increased solubility. Upon drying, however, the molecular chains recoil, thereby producing the above-outlined reversion effects.

Many attempts have been made in the prior art to solve the aforementioned problems, but they have met with only limited success. For example, co-owned U.S. Pat. No. 2,949,428 discloses a method of increasing the cold water solubility of locust bean gum which involves agitating a mixture of the finely powdered gum and a sugar such as dextrose, followed by spraying the mix with water and applying heat and finally drying this mixture. While this process yields locust bean gums which have increased cold water-solubility, the end product is not suitable for all purposes because of the necessary addition of sugar. Hence, the modified gums produced by that method are of only limited utility. Therefore, there has been a need in the art for a method of producing cold water-soluble locust bean gums for more general applicability, without the need of sugar modification.

SUMMARY

Accordingly, it has been discovered that a cold water-soluble locust bean gum can be produced without any of the above-outlined difficulties. Specifically, the first step in the process comprises passing locust bean gum powder or flour through a processing zone for a period of time from about 15 seconds to 3 minutes. Sufficient water is provided with the gum in the processing zone to bring the moisture content thereof up to a level of from about 10 to 65 parts by weight of water for each 100 parts by weight of dry gum. It is to be noted that this moisture can be added to the gum prior to its introduction into the processing zone, or may be added while the gum is passing through the zone.

During its passage through the processing zone the locust bean gum is subjected to a cooking step which includes increasing the temperature of the gum while simultaneously applying high compressive and shear forces, the entire process being regulated so that the temperature of the gum as it exits from the processing zone is from about 160° to 300° F. As will be discussed more fully below, it has been found that the present invention can advantageously be performed in an efficient, continuous fashion by employing a cooker-extruder which is capable of operating at the parameters defined above.

In another preferred embodiment it has been found to be particularly beneficial to mix with the locust bean gum a quantity of guar gum which is then processed with the gum. This gum can generally be defined as a "cold water soluble colloid" i.e., as being able to attain a greater fraction of its intrinsic viscosity in cold water than the locust bean gum to be solubilized. It has generally been found that this additive is helpful when employed in an amount of from about 0.5 to 50 parts by weight for each 100 parts by weight of the gum to be solubilized.

Throughout the specifications and claims completely hydrated colloids of the type contemplated by this invention will be referred to as "solubilized." Although this is common terminology in the art, it is to be understood that they are more properly termed "suspensions," and that the present invention is not limited by any strict definition of the physical or chemical phenomena occurring during its practice.

In a still further embodiment it has been discovered that an admixture of the cold water-soluble guar gum and a water-soluble sugar may be added to the locust bean gum prior to processing to provide additional desirable solubility and viscosity characteristics.

DETAILED DESCRIPTION

As discussed above, the primary step of the present invention (i.e., the cooking step) occurs in a processing zone adapted to provide elevated temperatures as well as compression, agitation, and shear forces on the locust bean gum contained therein as it is advanced through the zone. It is specifically contemplated that this function can best be achieved by employing a cooker-extruder having a main chamber provided with a rotatable, compression, agitation and shear screw, and an extrusion means in the outlet end of the chamber which presents at least one die opening for the final extrusion of the gum. In practice, a 50 horsepower Wenger X-25 (Wenger Mfg. Co., Sabetha, Kansas) continuous cooker-extruder has been satisfactorily employed; this extruder conforms to the description above, and yields good results when used in commercial-scale runs.

It has also been found that the retention time of the locust bean gum within such a cooker-extruder at a given temperature level is important in establishing preferred characteristics of the final product. Specifically, when the extruder is operated such that the locust bean gum exiting therefrom has a temperature of from about 160° to 300°F., it is necessary to maintain a product retention time within the processing zone of the extruder of from about 3 minutes to 15 seconds. The preferred ranges of temperature and retention time have been found to be from 2 minutes to 15 seconds, with a corresponding exit temperature of about 200° F. However, it is to be appreciated that the exact operating parameters required for optimum results will depend upon type and consistency of locust bean gum used, temperature gradient within the processing zone, pressure and amount of compressive and shear forces applied, but generally temperature and time will be inversely related. The final operative parameters can be readily established through routine experimentation, based upon the end product desired. The ranges given serve to define the broad areas wherein the present method achieves the most beneficial results.

The water may be added either before the introduction of the gum into the processing zone, or can be introduced (preferably in the form of steam) while the gum is passing through the processing zone. After sufficient cooking within the processing zone, the locust bean gum is extruded through at least one die provided at the end of the cooker-extruder. Following this conventional extrusion, the product is preferably dried and milled to any desired size.

While the specific physical modification occurring during the processes of the present invention are not fully known, it is believed that the forces applied to the coiled molecular chains of the gum prevents their recoiling as previously described. In this way, the molecular chains remain "open" and are therefore more easily solubilized. Additionally, it is thought that when cold water-soluble guar gum is added to the locust gum, it becomes attached to the open molecular chains by way of hydrogen bonding and localized coiling, thereby preventing the full recoiling of the locust bean gum molecules.

In the development of the present invention, it was unexpectedly discovered that while sugar-modified, cold watersoluble locust bean gum can be produced under atmospheric conditions with no compressive or shear forces acting on the gum, cold water-soluble sugar free locust bean gum can be prepared only by using high compression and shear treatment thereof, even when the guar gum additive is employed. Specifically, while the use of methods as taught in U.S. Pat. No. 2,949,428 gives cold water-soluble gums through the use of sugar additives, water, and simple heating, it is necessary to employ the more drastic physical conditions of a cooker-extruder or the like when a cold water-soluble locust bean gum is desired which is free of sugar additives. Simple heating under atmospheric conditions, even in the presence of a cold water-dispersible colloid, does not impart appreciably enhanced solubility in the final locust gum.

In a preferred embodiment of the present invention, cold water-soluble guar gum was added to enhance the cold water solubility of the final product, as outlined above. The percentage limitation upon the addition of this agent is generally not critical within the ranges defined, i.e., from about 0.5 to 50 parts by weight guar gum for each 100 parts by weight of the gum to be solubilized. The specific weight percentage employed depends most importantly on the final solubility and viscosity characteristics desired, but all mixtures within these ranges do exhibit cold-water solubility. For example, it has been found that above a level of about 40 percent by weight, the locust bean gum in some cases begins to lose some of its native characteristics, and the admixture in some respects begins to resemble the guar. Specifically, with the addition of guar gum above a level of about 30 to 40 percent by weight, the final product appears stringy, which is a natural characteristic of the guar. Therefore, the preferred range is from about 0.5 to 30 parts by weight guar gum for each 100 parts by weight locust bean gum.

In those cases where carbohydrate material can be tolerated in the formulation, it has been found somewhat beneficial to admix a sugar such as, for example, dextrose, sucrose, lactose and maltose with the locust bean gum to be processed. When this is done without the addition of guar gum, the resulting product still has an increased cold water-solubility in comparison with the sugar modified gums of the prior art.

Additionally, if both guar and a sugar are employed, a still greater enhancement of solubility is obtained. In such a situation, good results are obtained by the addition of from about 0.5 to 50 parts by weight of the guar and from about 10 to 900 parts by weight of the sugar for each 100 parts by weight of the gum to be solubilized. Likewise, when only the sugar is added, an amount of from about 10 to 900 parts by weight of the sugar for each 100 parts by weight of the locust bean gum is found to yield highly soluble end products.

The following specific Examples are given by way of illustration only, and it is to be understood that the invention is in no way limited thereto.

EXAMPLE I.

A quantity of 100 percent locust bean gum was thoroughly mixed to insure uniform consistency and sufficient water was added such that the gum had a moisture content of approximately 30 parts by weight of water for each 100 parts by weight of dry gum. Mixing was continued until all lumps were broken. The product was then continuously run through a five horsepower Wenger X-5 cooker-extruder having a variable opening die at its extrusion end which was closed to its minimum orifice size. The mixture was retained within the processing zone of the extruder for times varying between 15 seconds and 3 minutes, and the temperature of the gum exiting from the extruder was maintained at about 200° F.

After extrusion, the product was dried with agitation, and milled to desired mesh sizes, depending upon the rate of hydration sought. The processed locust bean gum at a concentration of 0.575 percent by weight and a temperature of 80° F. was found to have a viscosity of 57.5 centipoise (cps) while the unprocessed gum showed a viscosity of 17.5 cps. Viscosity change is the most commonly accepted method of measuring the "solubility" of the products, and it serves to demonstrate the effectiveness of a particular process for enhancing cold water-solubility.

EXAMPLE II.

Quantities of locust bean gum and guar gum were thoroughly mixed in their dry form in a Hobart mixer. The relative proportions of the mixture was 95 percent locust bean gum and 5 percent guar gum, by weight. Water was thereafter added to raise the moisture content of the mixture to about 30 parts by weight of water for each 100 parts by weight of the dry mixture, followed by further mixing to achieve a uniform consistency. The pre-wetted gum mixture was then continuously fed into a Wenger X-5 cooker-extruder under the conditions specified in Example I. Following the extrusion process, the end product was again dried and milled to mesh sizes varying from 40 to 105 (USC). The modified locust bean gum was tested as in Example I and showed a viscosity of 74.5 cps as contrasted with the unmodified gum mixture, which gave a value of 24.0 cps.

EXAMPLE III.

An admixture of 90 percent locust bean gum and 10 percent guar gum was treated in a manner similar to that recited in Example II., all critical parameters being identical. The final product gave a viscosity of 104.0 cps at a concentration of 0.575 percent by weight and a temperature of 80° F., as compared with an unprocessed mixture which had a viscosity of 25.0 cps.

EXAMPLE IV.

In this and all of the following Examples, the moisture content of the locust bean gum or admixtures thereof was maintained at a level of about 30 parts by weight water for each 100 parts by weight of the gum to be solubilized. Similarly, in all such Examples the experimental procedures are as outlined above in Example II. Hence, this Example, as well as those which follow illustrate the variety of locust bean gum and other additive mixtures which may be employed within the confines of this invention. (Percentages are all expressed on a weight basis).

| Locust bean gum | 81.8% |
|---|---|
| Guar gum | 17.5% |
| Pectin | .35% |

The final product of this mixture gave a viscosity reading of 115.0 cps as compared with the unmodified mixture, which gave a viscosity reading of 26.0 cps.

EXAMPLE V

| Locust bean gum | 70% |
|---|---|
| Guar gum | 30% |

The final product gave a viscosity of 130.0; the unmodified mixture gave a viscosity of 45.0.

EXAMPLE VI

| Locust bean gum | 50% |
|---|---|
| Guar gum | 50% |

EXAMPLE VII

| Locust bean gum | 45.8% |
|---|---|
| Guar gum | 10.0% |
| Sucrose | 44.0% |
| Pectin | 0.2% |

EXAMPLE VIII

| Locust bean gum | 58.70% |
|---|---|
| Guar gum | 12.80% |
| Sucrose | 28.25% |
| Pectin | 0.25% |

EXAMPLE IX

| Locust bean gum | 81.80% |
|---|---|
| Guar gum | 17.85% |
| Pectin | .35% |

Having thus described the invention, what is claimed as new and desired to be secured by Letters Patent is:

1. A method of increasing the water-solubility of locust bean gum comprising the steps of:
   a. passing sugar free locust bean gum through a processing zone for a period of time from about 15 seconds to 3 minutes, sufficient water being provided in the gum to cause the moisture content thereof to be at least at a level of from about 10 to 65 parts by weight of water for each 100 parts by weight of dry gum;
   b. applying high compressive and shear forces to said gum while in said zone;
   c. increasing the temperature of the gum in said zone while said compressive and shear forces are applied thereto; and
   d. extruding the gum from said zone, the temperature of the gum being increased sufficiently in said zone such that gum exits therefrom at a temperature of from 160° – 300° F.

2. A method in accordance with claim 1, wherein is included the step of adding water to the gum to be solubilized prior to introduction of said gum into the processing zone.

3. A method in accordance with claim 1, wherein is included the step of adding water to the gum to be solubilized while said gum is passing through the processing zone.

4. A method in accordance with claim 1, wherein is included the step of passing the gum through the processing zone in a period of time of from about 2 minutes to 15 seconds.

5. A method in accordance with claim 1, wherein is included the step of mixing guar gum with said locust bean gum prior to extrusion thereof from the processing zone, said guar gum being added in an amount of from about 0.5 to 50 parts by weight for each 100 parts by weight of the gum to be solubilized.

6. A method in accordance with claim 5, wherein is included this step of adding guar gum in an amount of from about 0.5 to 30 parts by weight for each 100 parts by weight of the gum to be solubilized.

7. A method in accordance with claim 1, wherein is included the step of adding sufficient water to the gum to be solubilized to yield a moisture content of from 30 to 35 parts by weight of water for each 100 parts by weight of said gum.

8. A method in accordance with claim 1, wherein is included the step of maintaining the temperature of the product exiting from the processing zone at a temperature of about 200° F.

9. A method in accordance with claim 1, wherein is included the step of drying the extruded product with agitation and subsequently milling the product.

10. A method of increasing the water-solubility of locust bean gum comprising the steps of:
   a. introducing sugar free locust bean gum into the processing zone of a cooker-extruder having a main chamber provided with a rotatable compression, agitation and shear screw and an extrusion means in the outlet end of the chamber presenting at least one die opening for extrusion of the gum therethrough;
b. providing sufficient water in the gum in said zone to cause the moisture level thereof at the time of extrusion through the extrusion means to be at a level of from about 10 to 65 parts by weight for each 100 parts by weight of the gum to be solubilized; and
c. subjecting the gum in said processing zone to temperature, compression, agitation and shear conditions for a time period of from about 3 minutes to 15 seconds to cause the temperature level of the gum to be at a level of from 160° – 300° F. at the time of extrusion thereof from the chamber through said extrusion means.

11. A method in accordance with claim 10, wherein is included the step of adding water to the gum to be solubilized prior to introduction of said gum into the processing zone.

12. A method in accordance with claim 10, wherein is included the step of adding water to the gum to be solubilized while said gum is passing through the processing zone.

13. A method in accordance with claim 10, wherein is included the step of passing the gum through the processing zone for a period of time of from about 2 minutes to 15 seconds.

14. A method in accordance with claim 10, wherein is included the step of mixing guar gum with the locust bean gum prior to extrusion thereof from the processing zone, said guar gum being added in an amount of from about 0.5 to 50 parts by weight for each 100 parts by weight of the gum to be solubilized.

15. A method in accordance with claim 10, wherein is included the step of adding the guar gum in an amount of from about 0.5 to 30 parts by weight for each 100 parts by weight of the gum to be solubilized.

16. A method in accordance with claim 10, wherein is included the step of adding sufficient water to the gum to be solubilized to yield a moisture content of from about 30 to 35 parts by weight of water for each 100 parts by weight of said gum.

17. A method in accordance with claim 10, wherein is included the step of maintaining the temperature of the product exiting from the processing zone at a temperature of about 200° F.

18. A method in accordance with claim 10, wherein is included the step of drying the extruded product with agitation and subsequently milling the product.

* * * * *